United States Patent
Rickerson, Jr.

(10) Patent No.: US 6,581,825 B1
(45) Date of Patent: Jun. 24, 2003

(54) TELEPHONE MODEM TO SATELLITE DATA CONVERTER FOR MOBILE FINANCIAL TRANSACTIONS

(76) Inventor: Donald Rickerson, Jr., 10317 Amberleigh Ct, Manassas, VA (US) 20110

(*) Notice: Subject to any disclaimer, the term of this patent is extended or adjusted under 35 U.S.C. 154(b) by 0 days.

(21) Appl. No.: 09/825,625

(22) Filed: Apr. 4, 2001

Related U.S. Application Data

(60) Provisional application No. 60/194,899, filed on Apr. 6, 2000.

(51) Int. Cl.$^7$ .................................................. G06F 17/60
(52) U.S. Cl. ........................................ 235/379; 709/201
(58) Field of Search ........................... 235/379; 709/201

(56) References Cited

U.S. PATENT DOCUMENTS

| | | | |
|---|---|---|---|
| 5,280,625 A | * 1/1994 | Howarter et al. | |
| 5,539,810 A | 7/1996 | Kennedy, III et al. | ... 379/88.25 |
| 5,719,918 A | 2/1998 | Serbetciouglu et al. | ..... 380/271 |
| 5,930,767 A | 7/1999 | Reber et al. | ................... 705/26 |
| 5,999,624 A | 12/1999 | Hopkins | ...................... 705/70 |
| 6,052,068 A | * 4/2000 | Price R-W et al. | |
| 6,105,060 A | * 8/2000 | Rothblatt | |
| 6,158,655 A | 12/2000 | DeVries, Jr. et al. | ....... 235/380 |
| 6,169,975 B1 | 1/2001 | White et al. | ................... 705/44 |
| 6,208,851 B1 | 3/2001 | Hanson | ....................... 455/405 |

* cited by examiner

Primary Examiner—Thien M. Le
Assistant Examiner—Daniel Hess

(57) ABSTRACT

The Telephone Moderm to Satellite Data Converter (TM/SD converter) allows for the replacement of a telephone line or cell phones for sending and receiving financial transaction data with a mobile satellite data system. The important feature offered by the TM/SD Converter is the ability to use common transaction equipment that is equipped with a telephone modem by interfacing them with a satellite transceiver. It replacements the telephone line in the data path of the transaction. This is important in rural and hard-to-get-to places where a telephone line is both expensive to run and unreliable. Using a worldwide satellite system like Iridium™, it allows secure and reliable transactions to geographical areas that previously could not access the necessary host data system because of none existent or high-cost telephone circuits. Being able to insert the TM/SD Converter into an existing situation where telephone circuits are presently used is important to it be a modular solution. It allows a merchant is a credit card machine with telephone modem to simply plug in the TM/SD Converter into an existing situation where a telephone line is not cost effective (i.e., at a remote site) or available (i.e., a new mobile unit) without having to convert any other equipment. The TM/SD also addresses the high cost of narrowband satellite data by using intelligent compression based on the type of data fields in the transaction. Security is added to the transaction standard synchronous encryption program (like DES) after the compression of the data and before its transmission. For some applications this may be unnecessary, for example, gathering whether data but other situations, for example, credit card transactions, it is desirable because we are now in a broadcast mode of sensitive data. It is important to note than telephone modem applications; even one using cellular do not bother to encrypt. Other types of transactions that could be sent are; security checks, vending information, or other short burst transaction sent over telephone circuits.

1 Claim, 4 Drawing Sheets

Telephone-to-Satellite Data

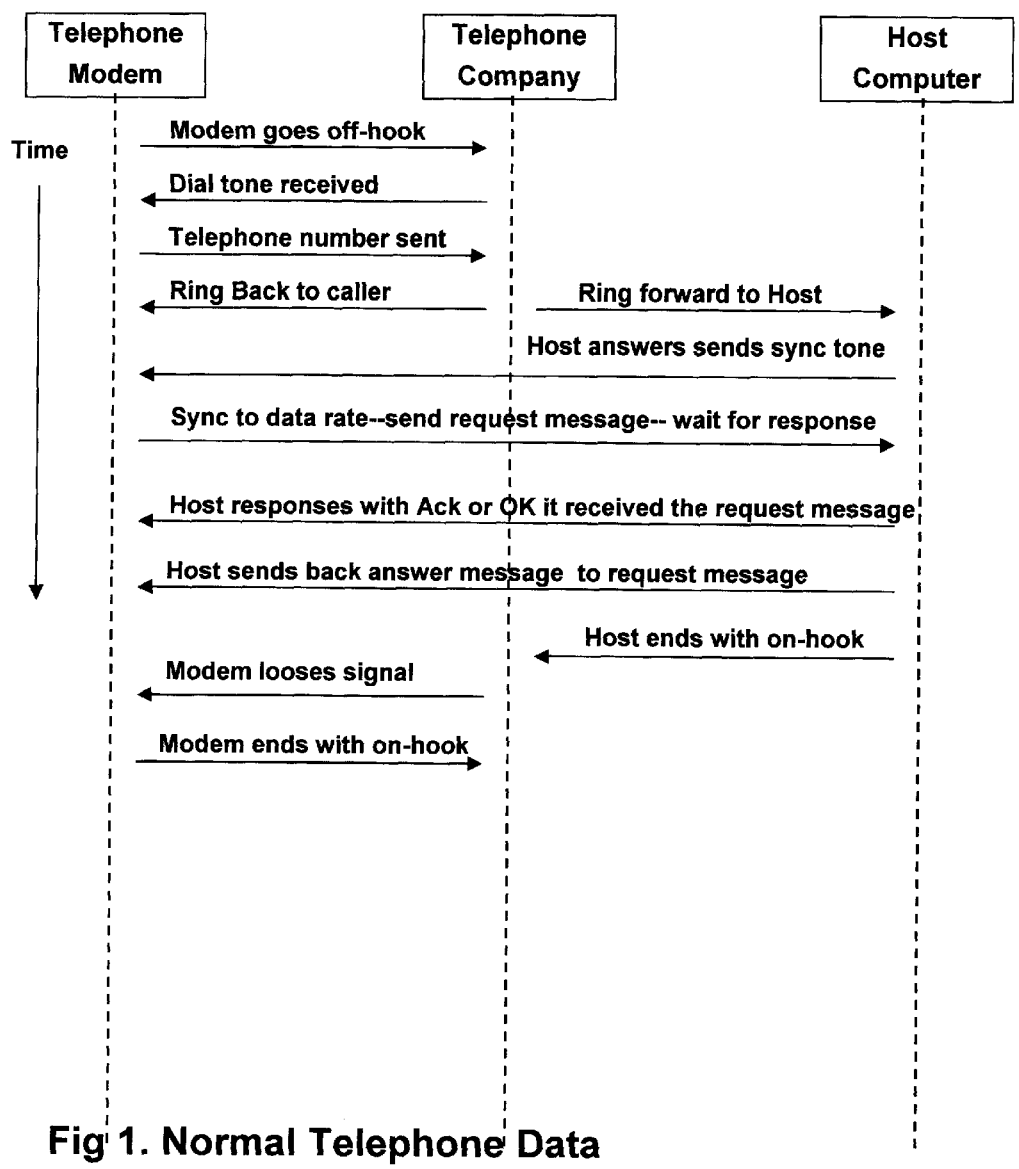
Fig 1. Normal Telephone Data

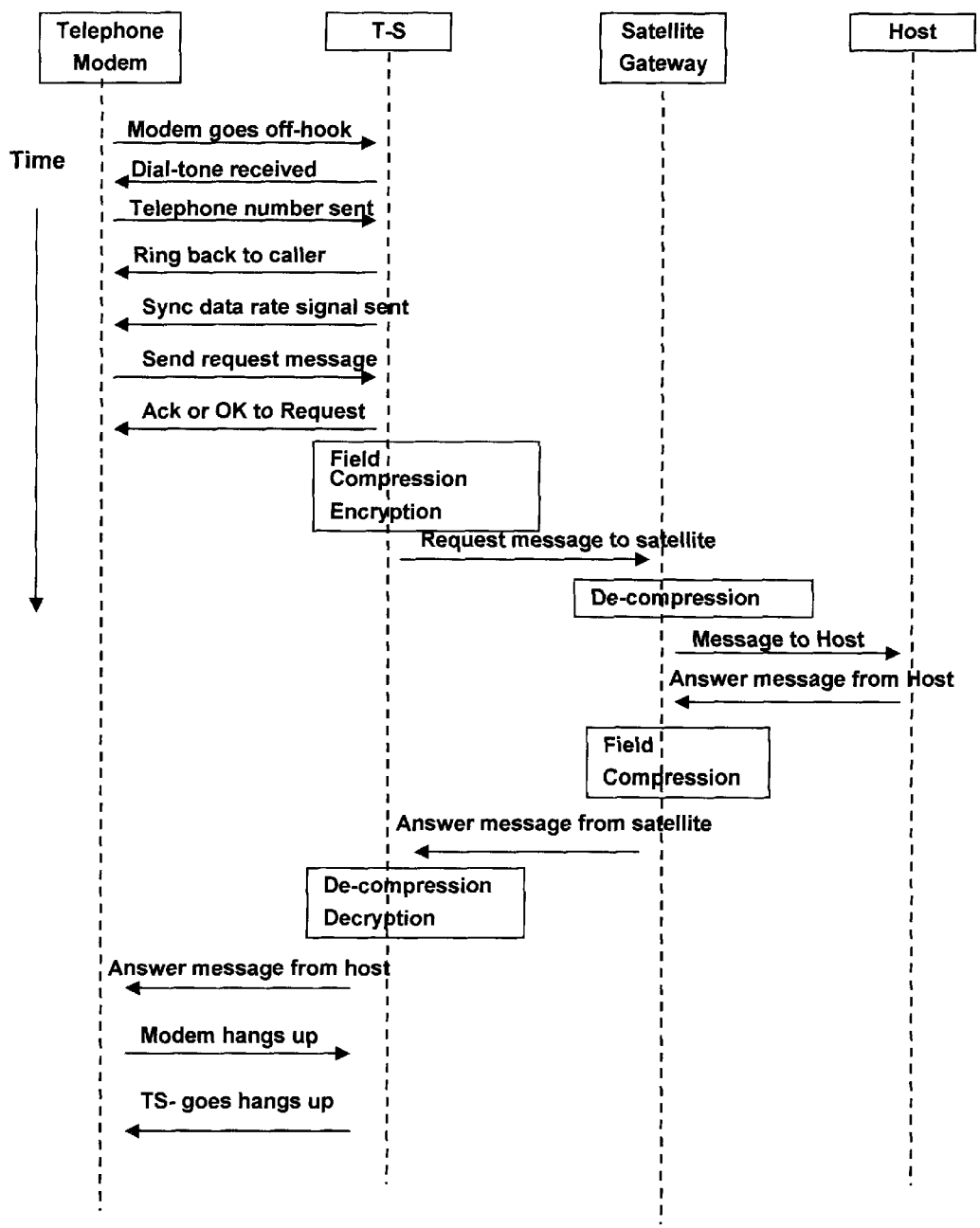
Fig 2. Telephone-to-Satellite Data

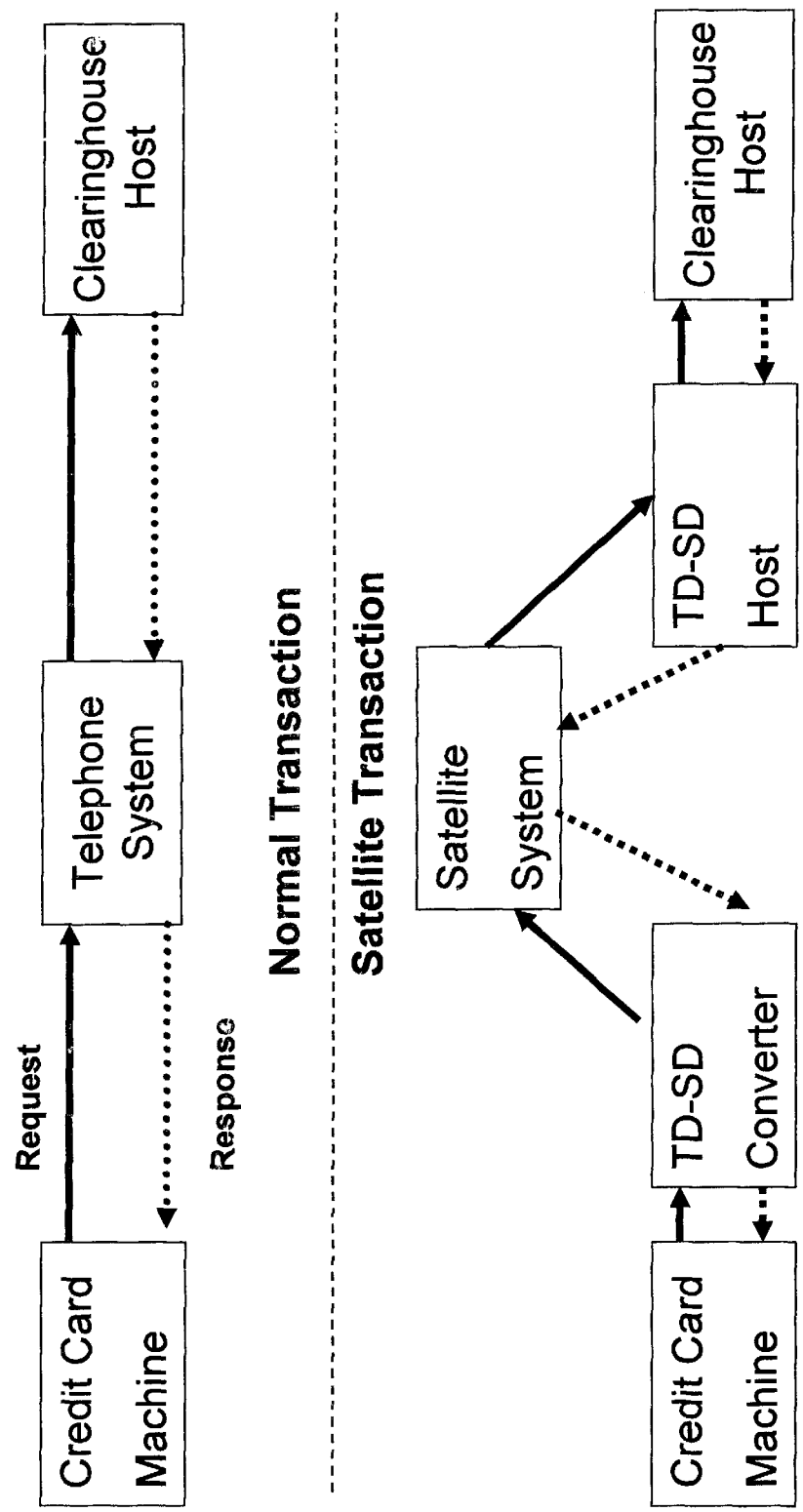

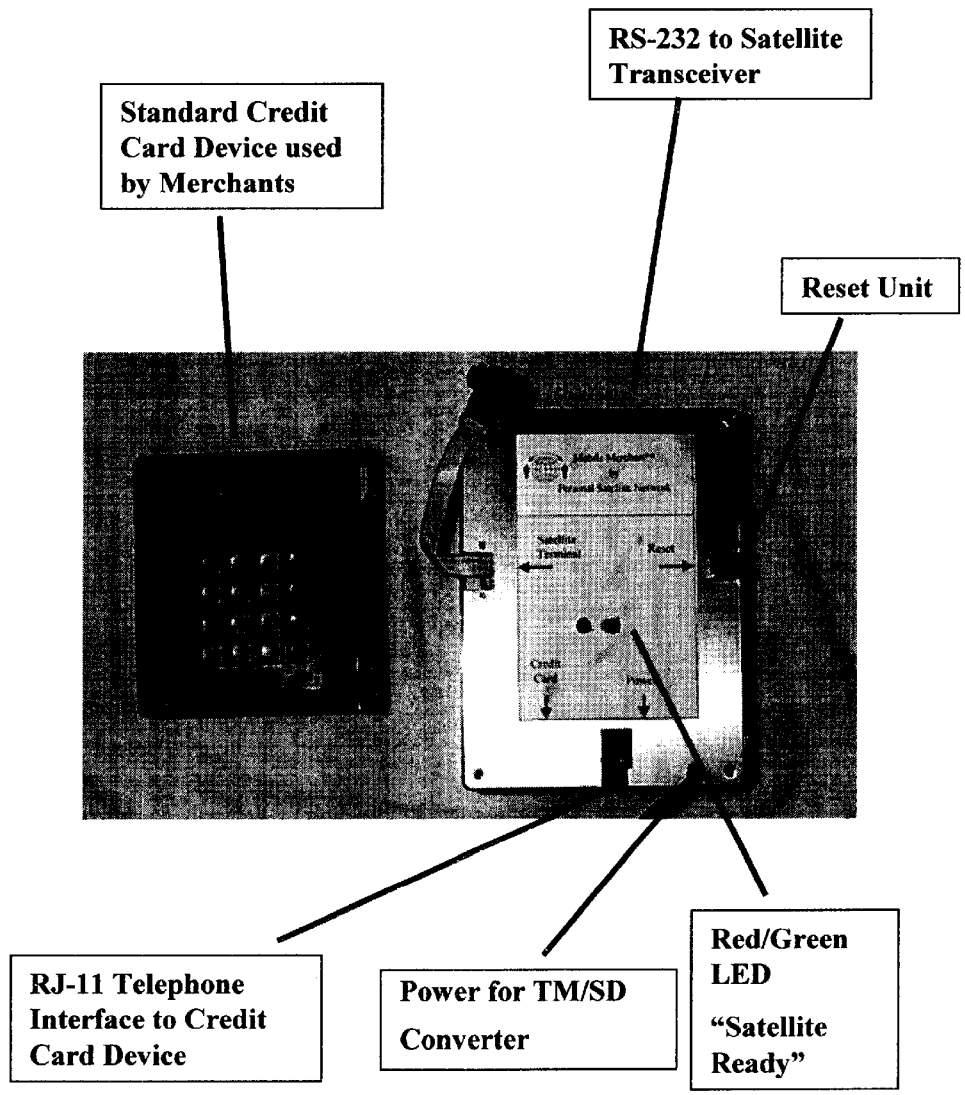
Fig 4. Telephone Modem to Satellite Data Converter with a standard credit card device

TELEPHONE MODEM TO SATELLITE DATA CONVERTER FOR MOBILE FINANCIAL TRANSACTIONS

CROSS-REFERENCE TO RELATED APPLICATIONS

Provisional Patent Application: 60/194,899 Apr. 6, 2000

BACKGROUND-FIELD OF INVENTION

This invention is a method of executing mobile financial transactions using standard telephone devices for ATM, credit or debit cards, using a two-way mobile satellite transceiver to communicate with a central financial host computer that authorizes the transactions in an efficient manner.

BACKGROUND-DESCRIPTION OF PRIOR ART

Financial transaction machines, ATM, credit or debit card, have traditionally used telephone circuits to communicate with a host computer at a financial institution to authorize the transactions. A modem version of the telephone is the cellular telephones. These also provide a relatively wide-bandwidth and inexpensive channel in which to conduct the transaction. Using a telephone circuit is impractical with mobile satellite communications transaction because of the high cost of the satellite channel.

Cellular systems although somewhat mobile are limited in coverage. They can only be used in the areas with there is cellular coverage. They additionally lack standardization in frequency, equipment and protocols between different carriers even with the same geographic area. The TM/SD system differs from other satellite telephone or cellular system that simply extends the telephone circuit through a different medium. Other previous patents that express mobility features are based on cellular telephones, these patents lack the true mobility offered by a satellite-based service.

The following example of the present art rely on cellular (terrestrial) communication and are far too verbose, and therefore expensive, to be useful for satellite communication; U.S. Pat. No. 6,151,491 to Farris (2000), U.S. Pat. No. 6,141,404 to Westerlage (2000), and U.S. Pat. No. 6,128,489 to Seazholtz (2000) Use of CDPD to convey identification list data to roaming cellular subscriber station to also uses only cellular communications.

Remote financial transaction system, U.S. Pat. No. 5,999, 624 to Hopkins (1999) is also relies on a very wide-band satellite (or other) to vend large amounts of information on demand as well as billing for the sale. This is similar to Automatic vending machine for vending information transmitted from satellite, U.S. Pat. No. 5,699,328 to Ishizaki.

Remote financial transaction system to Hopkins U.S. Pat. No. 5,999,624 (1999) is connected with the bio-identification of the consumer and not the data transmission means.

Portable card authorizer to Tognazzini U.S. Pat. No. 5,850,077 (1998) promotes the use of a portable card reader, as we see at rental car places today that communicates to a local transaction serve which then communicates over a standard telephone line. Likewise, Automated payment system and method to Pollin U.S. Pat. No. 6,041,315 (2000) uses a telephone line for the actual transaction to the host computer.

Another patent referred to cash register tax collection, but makes assumption on periodic (quarterly) downloads to a central facility. Such infrequency suggests a telephone circuit as the only economical way to download a large volume when there is no sense of urgency.

A mobile transaction device can easily travel outside of cellular coverage so a satellite-based unit is needed for true mobile service.

The common VSAT (Very Small Aperture Antenna) systems are used for fixed site operations, such as, banks, grocery stores, and gas stations. The satellite dishes must be accurately pointed at the satellite and provide a wide-band channel for passing transactions. To make the VSAT mobile a very expensive stabilizing platform must be used for the antenna and they use a different frequency band that permits mobile operation. The size of these units makes them impractical for mobile applications.

Mobile satellite service is more expensive than telephone service in terms of the cost per byte sent, with costs of a dollar or more per minute for voice service and data being priced per byte. It is important if the system is to be affordable, it must use the most efficient means of compressing the data as possible with the limited microprocessor capability to achieve a near-real time transaction and be cost effective.

In addition to the speed needed for a real time transaction, an intelligent compression method is needed for the satellite transmission because the cost of satellite data is so high. While general compression, methods can yield compression ratios of 2:1 or 3:1, an intelligent compression method of specific data fields and known information about the owner of the satellite transceiver can yield 5:1 or 10:1 compression ratios. The term we use for the intelligent compression method is the Field Dictionary Compression.

DESCRIPTION OF DRAWINGS

FIG. 1. The operation of a typical telephone modem. In that sequence a call is placed, a host computer answers, data is passed, and the call ends FIG. 2. The operation of the TM/SD Converter FIG. 3. System Diagram of TM/SD Converter FIG. 4. This is a picture of the TM/SD Converter with its initial application, a credit card reader.

DESCRIPTION OF INVENTION

The Telephone Modem to Satellite Data Converter (TM/SD converter) allows for the replacement of a telephone line or cell phones for sending and receiving financial transaction data with a mobile satellite data system. The important feature offered by the TM/SD Converter is the ability to use common transaction equipment that is equipped with a telephone modem by interfacing them with a satellite transceiver.

This idea is novel in that it allows for the modular replacement of telephone line in the data path. This is important in rural and hard-to-get-to places where a telephone line is both expensive to run and unreliable. It allows situations that previously could not access the said host system because of non existent or high cost telephone circuits. Being able to insert the TM/SD Converter into an existing situation where telephone circuits are presently used is important. The present telephone modem merchant can simply plug in the TM/SD Converter into an existing situation where a telephone line is not cost effective (i.e., at a remote site) or available (i.e., a new mobile unit) without having a convert any other equipment.

The TM/SD Converter can also add security to the application. A standard synchronous encryption program can easily be added into the processing of the data after it has been compress and before its transmission. For some applications this may be unnecessary, i.e. gather whether data but in others, i.e., credit card transactions, it is desirable because we are now in a broadcast mode. It is important to note than telephone modem applications; even ones using cellular do not bother to encrypt.

OPERATION OF INVENTION

The operation of the can be shown in comparing FIG. 1, Telephone Circuit Data and FIG. 2, Telephone Data to Satellite Data Converter.

The first difference is the replacement of telephone company equipment and a host modem that would answer the call from the remote telephone modem in the transaction equipment, with the TM/SD Converter and the TM/SD Server. The Converter has the analog modem and signaling which emulates the protocol from the host processor over a telephone circuit. This allows the TM/SD Converter to receive and send the transactional information to/form the transaction device.

However, satellite data system are relatively expensive, so in order to be cost effective the TM/SD Converter does not simply pass telephone modem signals through the satellite, it first accepts the entire data message from the telephone modem, uses intelligent compression method on the data fields.

The TM/SD Converter then passes the compressed data through the satellite system and reconstructs the data fields at the central TM/SD server. The central TM/SD Server must then decode the transaction message and then add the necessary data fields necessary for the transaction to be process by the host.

The reconstructed data message is then sent through a conventional telephone line, or more commonly today, the internet to the intended financial host computer. The authorization or decline of the transaction from the host is then processed back through the central TM/SD server and sent to satellite transceiver, the message is decompressed and given to the mobile transaction device.

This idea is novel in that it allows for the modular replacement of telephone line in the data path. This is important in rural and hard-to-get-to places where a telephone line are both expensive to run the wire and unreliable. It allows situations that previously could not access the host system to because of non existent or high cost telephone circuits.

FIELD DICTIONARY COMPRESSION METHOD

The Field Dictionary Method takes advantage of the known qualities the each field in the data package has to achieve the greatest compression possible. Combined with the TM/SD Converter hardware it can make a satellite link more cost effective that a telephone link in some cases.

A typical data message is broken down into fields. For example, a credit card transaction will have the card number, card expiration date, amount of transaction, and a merchant code. This data is encapsulated with a start-of-text, end-of-text and check byte.

The satellite data system itself can have a great effect on compression. Older telephone modem based systems often only used a 7-bits ASCII character set. The satellite data systems use a full binary transmission of 8-bits per character. This affords a greater compression possibility. This is because the ASCII character uses only seven of the 8 bits giving 127 of 256 possible combinations within a character (byte) where a full binary transmission uses all 8 bits in a byte (256 combinations).

A typical compression algorithm like zip or other popular software would look at the data transmission and substitute short symbols for repeating characters. Unfortunately, there are few repeating character sets in a short data message. So there is little value using the method for compression.

However, with Field Compression, we look at each field in the data transaction and determine the best method of compression for that field. We take advantage of the best compression technique for each field, so several compression methods are used for any one message. So taking our example with the credit card: the credit card number which is typically 13 to 16 numeric characters can be compressed into a binary 4-byte integer, the 4-bytes of the card expiration compressed into a 2-byte integer, the 7 character amount field compressed into a 2-byte integer, and 7 byte merchant code is implied because of the address of the sender. The start and end of text character are removed. Any field separators can also be removed as the fields can be implied by their position in the data message.

Additionally, other fields in the transactions are eliminated in the satellite transmission and filled in at the processing server before it is transmitted to the host financial computer. The merchant that owns the unit can be implied from the address on the satellite transmission.

So with simple compression techniques in each field we are able to get a 42-to-8 or about a 5-to-1 compression ratio. With the present satellite byte cost of 1 cent per byte, it is the difference between 40 cents and transaction and 8 cents a transaction. When this is scaled into tens of thousands of transactions per day, it means thousands of dollars per day, which is the difference between profitability and non-profitability for a company. In areas outside of local phone service or cheap cellular service, phones calls can cost dollars per minute. Using the TM/SD Converter can actually be less expensive the telephone service.

Encryption of the data is an option that can be added if desired. The encryption would be done with an accepted method, i.e., DES that would provide a reasonable amount of security for the type of data to be sent and the customer's requirements. By embedding the encryption into the software, it should not burden the timing of the transaction unreasonably.

CONCLUSION, RAMIFICATIONS, AND SCOPE OF INVENTION

Satellite communications has the advantage of operating anywhere that there is satellite coverage, without the need to be connected to any terrestrial provider. With the TM/SD Converter, a customer can use existing equipment to achieve the advantage of satellite service anywhere, even in a mobile operation.

The TM/SD Converter was initially invented for use with standard credit cards machines that use telephone circuit to connect to the credit card clearing house host computer. However, many systems create a simple data message to convey the status of a remote site or relaying some sort of sensor information periodically. Based on the cost of telephone service and its reliability, using the TM/SD Converter can lower costs and increase reliability.

This is important because the customers do not have to change the way they do business. They can add the TM/SD Converter in as many locations as needed. This allows them to use either telephone service or satellite service to their advantage. There is no need to wait for telephone service to be installed or activated. The broad coverage of the satellite means one unit works everywhere, unlike cellular where local service can vary.

Mobility is key to the TM/SD Converter. Merchants who could not use credit machines to authorize transactions can now affordably employ them wherever they are. Now other communications systems, including the cellular ones, can offer the coverage that satellite have today. The TM/SD system will offer service to merchants who could not afford to authorize a credit card transaction; tow trucks, flea marketers, craft show vendors, home repairs, seasonal businesses, hunting camps, remote sales locations and offshore business. All these people can greatly benefit from the ability to authorize a credit card during the transaction rather than taking a card at risk and processing it later.

Remote data collection can also benefit. Telephone line or other communications means in remote areas are expensive and unreliable. It is also hard to move any of these sites because of the need to move the communications means. The TM/SD Converter allows the remote sites to use the same telephone modems as the other sites, with no system modifications. They can also move the data collection sites as needed without worrying about the finding telephone service.

What is claimed is:

1. A method of executing mobile financial transactions using standard telephone devices for ATM, credit or debit cards, using a mobile satellite transceiver to communicate with a central financial host computer that authorizes the transactions, comprising:

(a) providing a mobile communications processor with which to convert telephone signaling from the mobile financial transaction device to and from the host financial computer which will:

(1) provide a process to convert analog telephone signals from the said mobile device to digital messaging through a digital satellite system, (2) provide a process to signal the said mobile device that will make it believe that it is connected to a host financial computer on a analog two-wire telephone circuit, (b) provide a process to receive transaction data from the satellite transceiver and present it to the host financial computer, (1) provide a process to convert the approval/disapproval of the said transaction from the host computer to the mobile device with (b) provide a process to receive transaction data from the satellite transceiver and present it to the host financial computer, (c) provide a process to convert the approval/disapproval of the said transaction from the host computer to the mobile device whereby the transaction can be performed without direct communication between the mobile transaction device and any terrestrial station, and whereby the transaction can be performed while the mobile unit is in motion on land, sea, or air, and whereby the transaction allows the use of common telephone modem equipped financial transaction devices with out any modification, whereby the said method can also be used in other situations where telephone modems are used to collect remote data to be sent to a central host processor.

* * * * *